Patented May 6, 1930

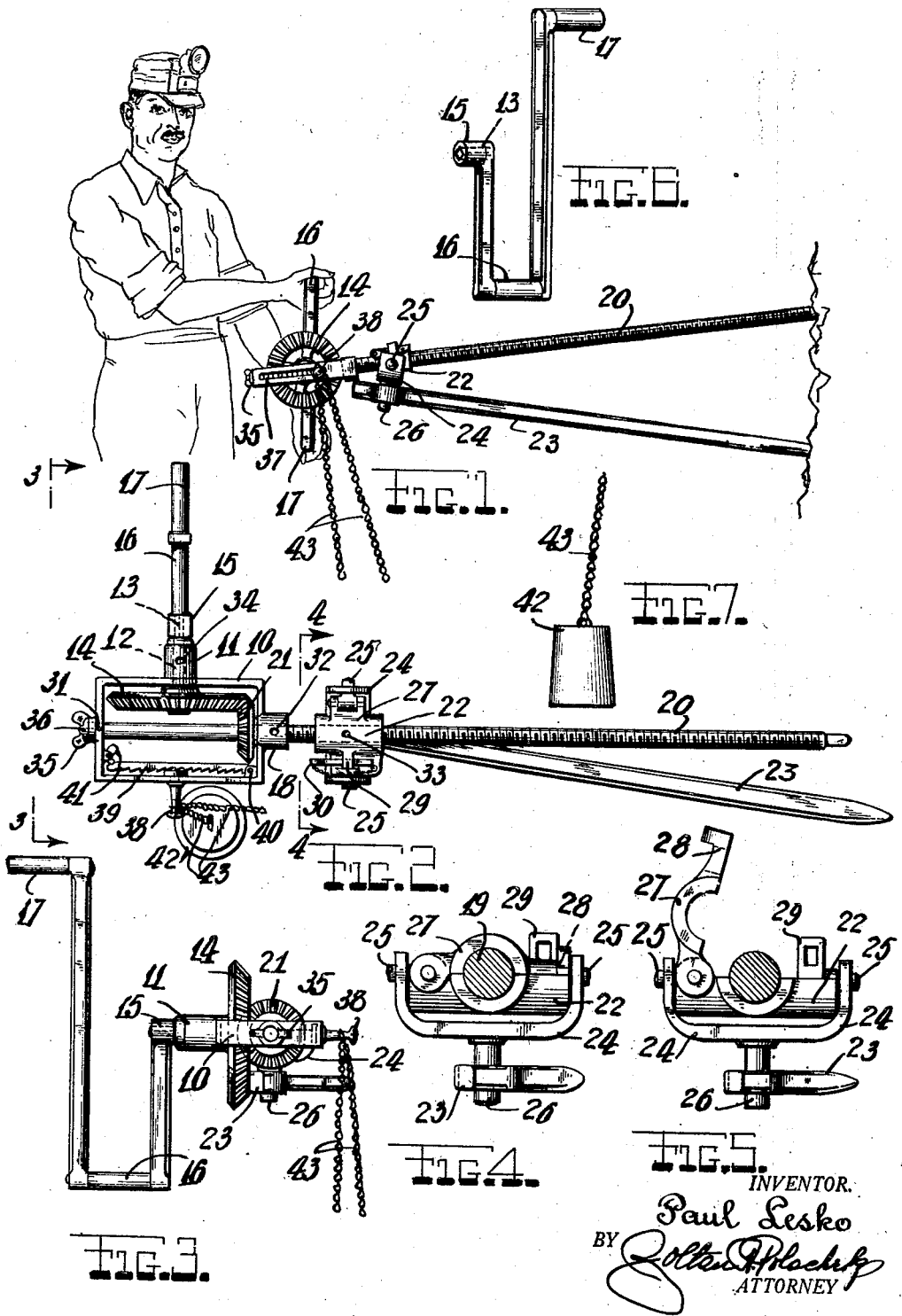

1,757,725

UNITED STATES PATENT OFFICE

PAUL LESKO, OF JESSUP, PENNSYLVANIA

MINER'S DRILL

Application filed July 10, 1928. Serial No. 291,610.

This invention relates generally to tools, and has more particular reference to a novel miner's tool.

The invention has for an object the provision of a device of the class mentioned, which is of simple durable construction, desirable and efficient in action, and which can be manufactured and sold at a reasonable cost.

The invention proposes the use of a frame with gears and a handle arranged for rotating a shank rotatively supported in a bearing connected by a universal joint on a support rod. The arrangement should be such that the shank may be moved in any direction relative to the support rod, and rotated by manipulation of the said handle.

For further comprehension of the invention, and of the object and advantages thereof, reference will be had to the following description and accompanying drawings, and to the appended claims in which the various novel features of the invention are more particularly set forth.

In the accompanying drawing, forming a material part of this disclosure:

Fig. 1 is a perspective view of the device in use.

Fig. 2 is a plan view of the device.

Fig. 3 is an end view looking in the direction of the line 3—3 in Fig. 2.

Fig. 4 is a vertical sectional view, taken on the line 4—4 of Fig. 2.

Fig. 5 is a similar view, but with the top half of the shank bearing raised.

Fig. 6 is a perspective view of the handle used in the device.

Fig. 7 is a perspective detail view of a counterweight used in balancing the frame of the device.

The reference numeral 10 indicates generally a frame provided with a boss 11 on its rear side for rotatively supporting a shaft 12 having an outer square end 13 and a gear 14 fixed on its inner end. Engaged on the square end 13 is the hub portion 15 of a handle having spaced hand portions 16 and 17 for accommodating the hands of a user as shown in Fig. 1 for manual turning of the gear 14.

One of the ends of the frame 10 is provided with a boss 18 for rotatively supporting a shank 19, together with the opposite end of the frame, and the front portion of the shank is threaded as indicated by numeral 20. A pinion 21 is engaged on the shank 19 and meshes with the gear 14.

The shank 19 engages in a bearing 22 connected by a universal joint connection with a support rod 23. This universal joint connection comprises a U-shaped member 24, and the bearing 22 has projecting pegs 25 rotatively mounted in the arms of the U-shaped member. The U-shaped member 24 has a projecting peg 26 rotatively engaged in the support arm 23. The bearing 22 may be turned in various horizontal positions by turning the U-shaped member about peg 26, and the bearing 22 may be turned in various vertical positions by turning about the pegs 25. The bearing 22 includes a pivoted top section 27 shown in raised position in Fig. 5. This section has an aperture 28 engageable over a lug 29 attached to the main portion of the bearing and a pin 30 is engageable thru the lug 29 for locking the pivoted section 27 in closed position.

The frame 10 is formed with an aperture 31 for oiling the shank 19, and the boss 18 is formed with an oil aperture 32 for the same reason. The bearing 22 has an oil aperture 33, and the boss 11 has an oil aperture 34. A wing member 35 and a securing pin 36 is engaged on the plain end of the shank 19.

Formed in the front side of the frame 10 is a slot 37, and a peg 38 is slidably mounted in this slot. An arm 39 is pivotally connected at one of its ends, as at 40 to the frame 10 and is forced into engagement by a latch 41 pivotally mounted on the frame 10 with the rear end of the peg 38 for holding the peg 38 in adjusted positions in the slot. A counterweight 42 is connected with a chain 43 the links of which are engageable on the peg 38. The counterweight may be supported at any desired height as determined by the particular link of the chain which is engaged on the peg 38, and the peg may be positioned along the side of the frame to a position best adapted for the counterweight to counterbalance the frame 10 for reason of the handle portions 16 and 17 being on one side thereof.

The forces set up by one turning the handle are the ones which need counterbalancing and these forces vary according to the individual operating of the device. Since the counterbalancing is a matter of individual taste the mass of the counterbalance and the position of the peg 38 must be determined by the individual himself.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention what I claim as new and desire to secure by United States Letters Patent is:

1. In a device of the class described, a frame for supporting the shank of a drill tool and provided at one side with a handle for operating the tool and the other side of the frame being formed with a slot, a peg for supporting a counterweight slidably mounted in the slot, and an arm pivotally mounted on the frame and arranged for engaging the rear of the peg for holding it in adjusted positions.

2. In a device of the class described, a frame for supporting the shank of a drill tool and provided at one side with a handle for operating the tool and the other side of the frame being formed with a slot, a peg for supporting a counterweight slidably mounted in the slot, an arm pivotally mounted on the frame and arranged for engaging the rear of the peg for holding it in adjusted positions, and a latch for holding the arm in engaging position.

In testimony whereof I have affixed my signature.

PAUL LESKO.